United States Patent [19]

Kinard

[11] 4,177,726
[45] Dec. 11, 1979

[54] AUTOMATIC BAG OPENER

[75] Inventor: Gerald W. Kinard, Hillsboro, Tex.

[73] Assignee: Certain-teed Corporation, Valley Forge, Pa.

[21] Appl. No.: 758,769

[22] Filed: Jan. 12, 1977

[51] Int. Cl.² .................. B65G 65/04; B30B 1/00
[52] U.S. Cl. ............................. 100/214; 414/412
[58] Field of Search ................... 198/485, 746; 193/35 SS; 214/304, 305

[56] References Cited

U.S. PATENT DOCUMENTS

| | | | |
|---|---|---|---|
| 2,180,163 | 11/1939 | Milmoe et al. | 198/485 |
| 2,790,527 | 4/1957 | Griffith | 193/35 SS |
| 3,224,609 | 12/1965 | Diltert | 214/305 |
| 3,664,530 | 5/1972 | Takiguchi | 214/305 |
| 3,739,471 | 6/1973 | Peres | 214/305 |
| 3,853,235 | 12/1974 | Lambert et al. | 214/305 |
| 3,889,442 | 6/1975 | Grahn et al. | 214/305 |
| 3,948,402 | 4/1976 | Shott, Jr. | 214/305 |

FOREIGN PATENT DOCUMENTS 2218026 11/1973 Fed. Rep. of Germany ......... 214/305
1315853 5/1973 United Kingdom ................ 214/305

Primary Examiner—Lawrence J. Oresky
Attorney, Agent, or Firm—Paul and Paul

[57] ABSTRACT

Apparatus automatically opens and empties a bag of material, such as asbestos, while removing from the surrounding environment material released from said bag during the opening process.

7 Claims, 13 Drawing Figures

AUTOMATIC BAG OPENER

BACKGROUND OF THE INVENTION

The present invention relates to an automatic bag opening apparatus, and more particularly to an apparatus for opening bags containing material harmful to humans.

It has recently come to the public's attention that certain construction materials, e.g., asbestos, can cause severe respiratory problems when humans are exposed to it.

To eliminate exposure from such building materials, it is advantageous to open bags of such material (asbestos) automatically and to have the environment around the automatic bag opener continually evacuated to eliminate particles of the material released during the bag opening operation from the area surrounding the automatic bag opener.

SUMMARY OF THE INVENTION

The principle object of the present invention is to provide an apparatus for automatically opening a bag of material.

Another object of the present invention is to provide an automatic bag opening apparatus which will automatically remove the contents of the bag and will automatically bail the opened and empty bag.

Another object of the present invention is to provide an automatic bag opening apparatus which is provided with a vent for evacuating from the environment particles released from the bag during the automatic opening process.

These and other advantages of the present invention will become apparent from a reading of the following description of the preferred embodiment.

DETAILED DESCRIPTION OF THE PREFERRED EMBODIMENT

The function of the apparatus of the present invention is to receive bags of material and automatically open and remove the bagged material therefrom. The present invention is specifically designed for use with bags containing material which may be harmful to humans, e.g., asbestos.

Figure 1:
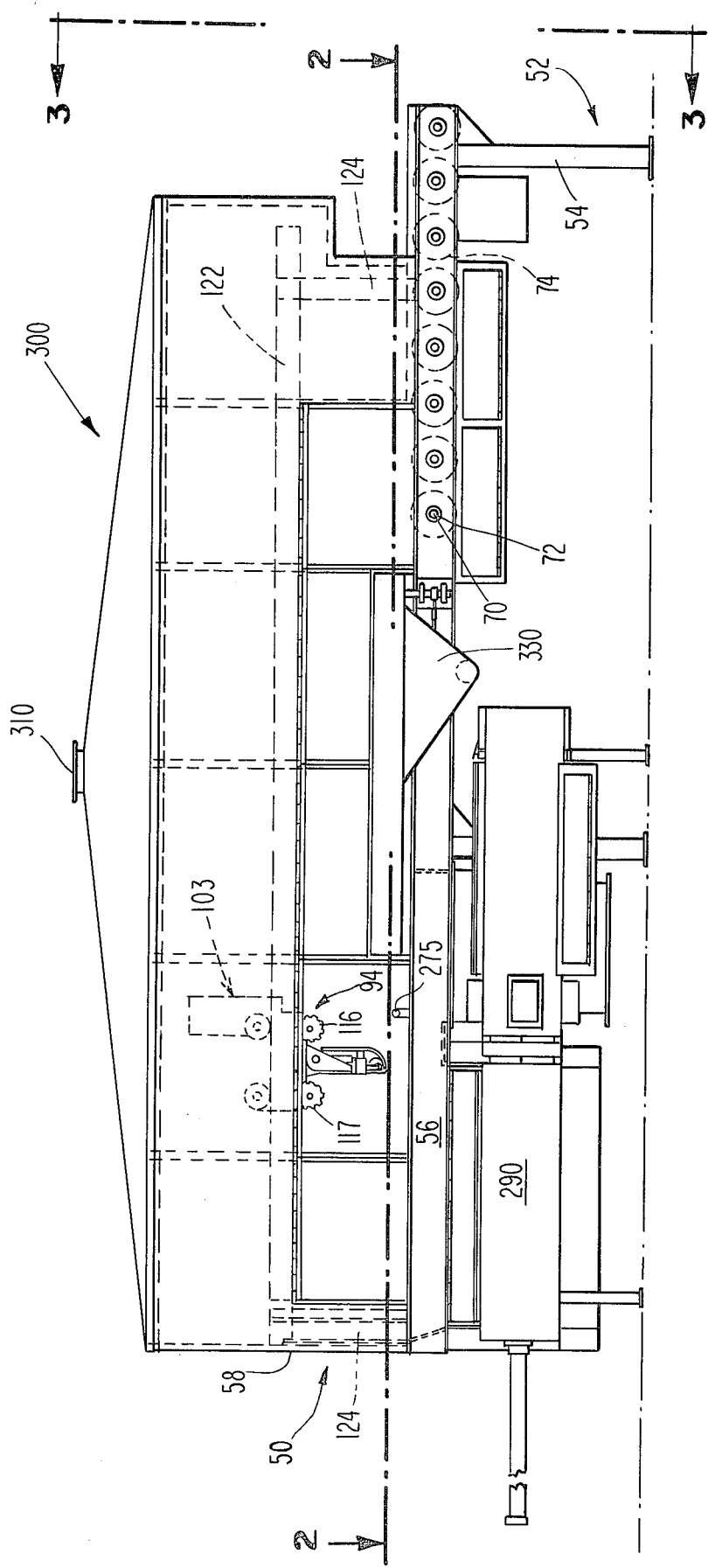
FIG. 1 is a side elevational view, partially in phantom, of the automatic bag opener apparatus of the present invention.

Referring now to the drawings and particularly to FIG. 1, there is shown an automatic bag opener 50 of the present invention. The automatic bag opener consists generally of a main frame 52 which includes vertical supports or legs 54 and horizontal connecting members 56 and 58. Shafts 70 are rotatably mounted to the two side supports, by bearings 72, or the like.

A plurality of sprockets 74 are rigidly mounted to shafts 70. These sprockets rotate with the rotation of shafts 70 to convey bags of material placed thereon into the apparatus. A suitable conventional drive means, e.g., an electric motor, (not shown) drives shaft 70.

Figures 2, 3:
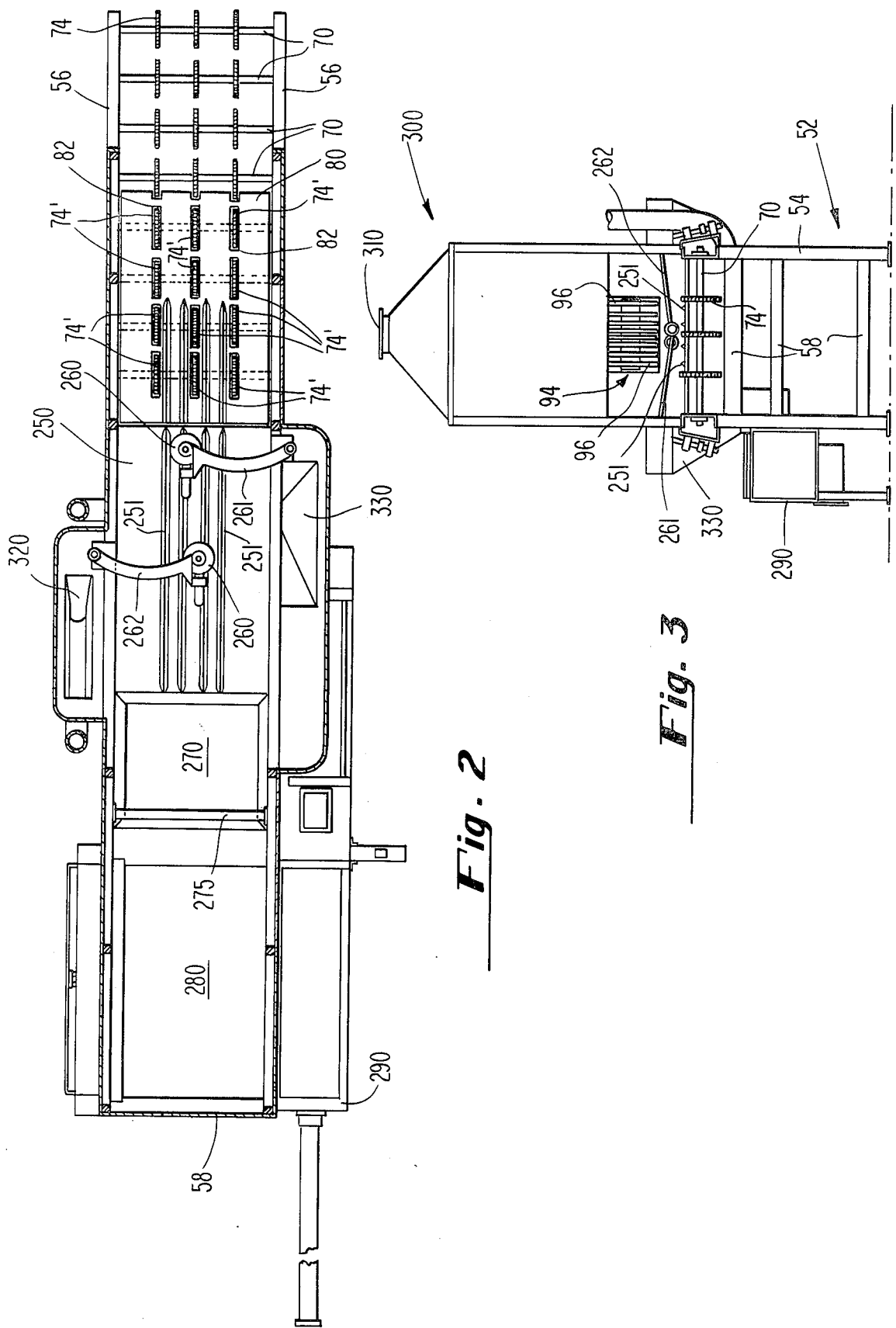
FIG. 2 is a view taken along lines 2—2 of FIG. 1.
FIG. 3 is an end view of the apparatus taken along lines 3—3 of FIG. 1.
Figure 5:
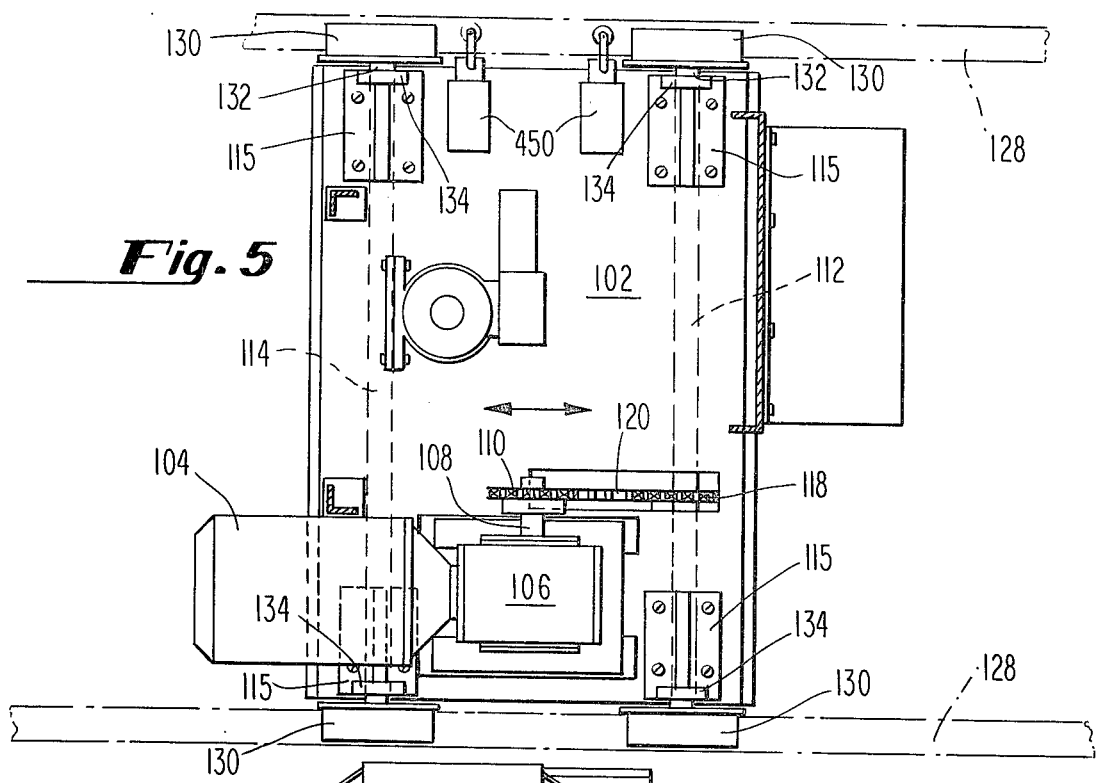
FIG. 5 is a view taken along lines 5—5 of FIG. 4.
Figure 4:
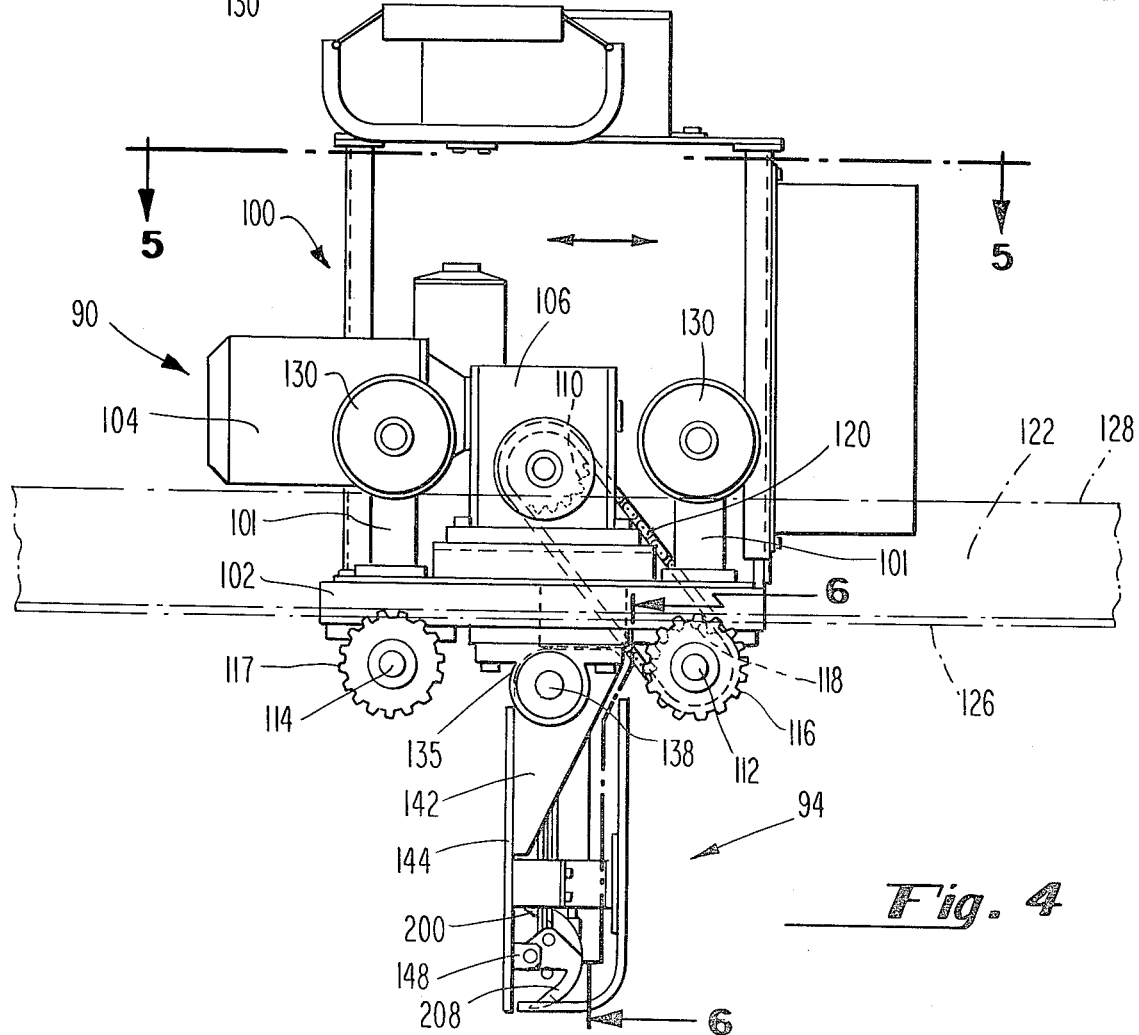
FIG. 4 is an enlarged elevation view of the bag gripping and moving means and the drive mechanism associated therewith.
Figure 10:
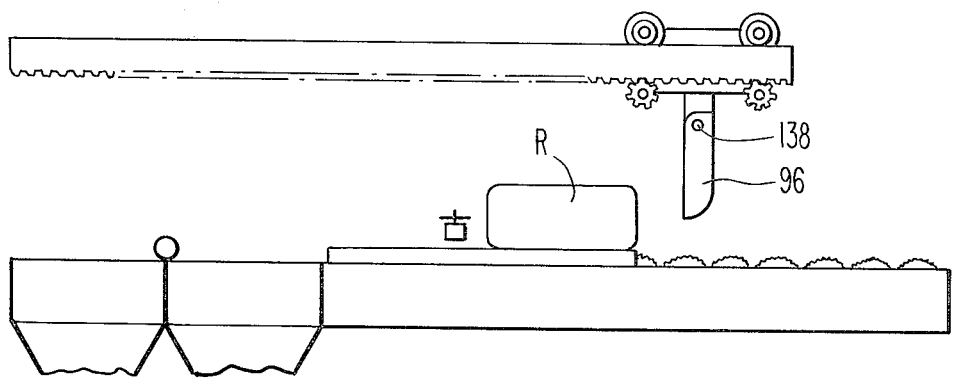

As illustrated in FIG. 2, a vertically movable first table 80 is normally positioned below the upper-most periphery of sprockets 74' and above shafts 70. This table contains apertures 82 through which sprockets 74', located within the boundary of the table, rotate. The structure of table 80 permits the sprockets to engage and convey bags of material to a position immediately above the table, as shown in FIG. 10.

As previously stated, table 80 is vertically movable to a position above the outer-most periphery of the sprocket conveyor. The table is moved vertically by any suitable conventional power source (not shown) e.g., a hydraulic cylinder, etc. The power source is activated by limit switches, shown in FIGS. 11 and 12. These switches, described hereinbelow, activate the power source for the table theereby raising the table from its lower position seen in FIGS. 8 and 9, above sprockets 74' causing the bag to be removed from the conveyor and supported on the table.

Figure 11:
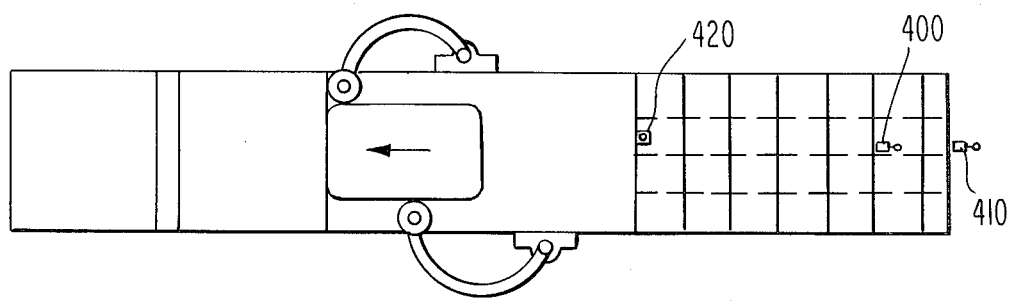
Figure 12:
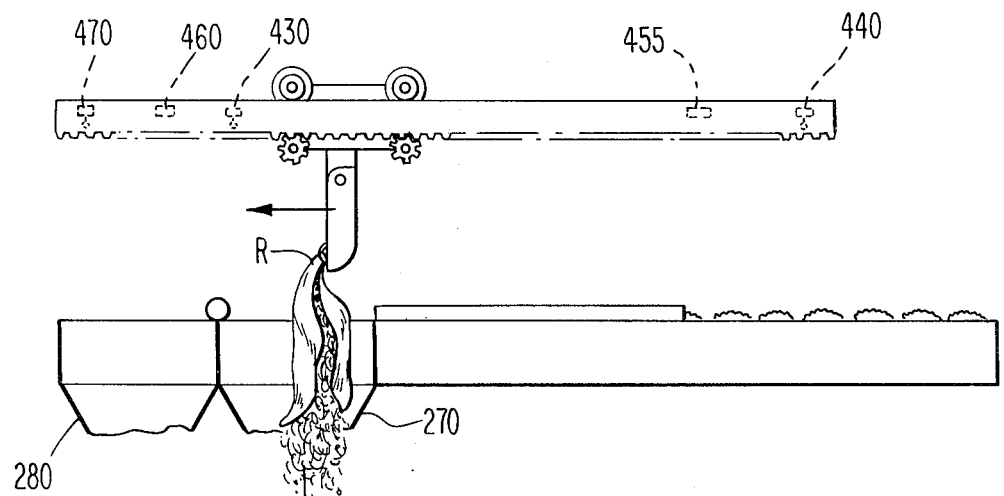

Prior to being completely removed from sprockets 74 of the conveyor, the bag has traveled to a position above the first table so as to contact limit switch 420, (shown in FIG. 11). This limit switch controls the operation of the conveyor and stops the conveyor thereby stopping the bag at this point.

Figure 7:
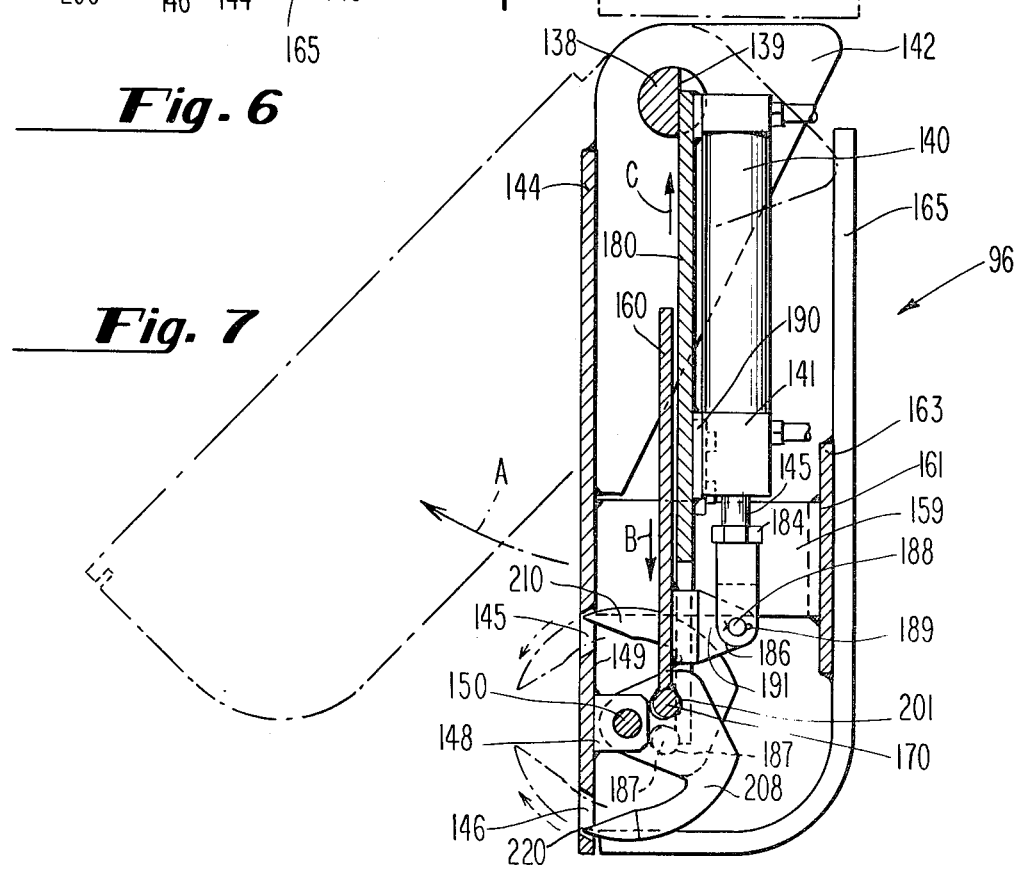
FIG. 7 is a view of the bag gripping and moving apparatus of the present invention, taken along lines 7—7 of FIG. 6.
Figure 8:
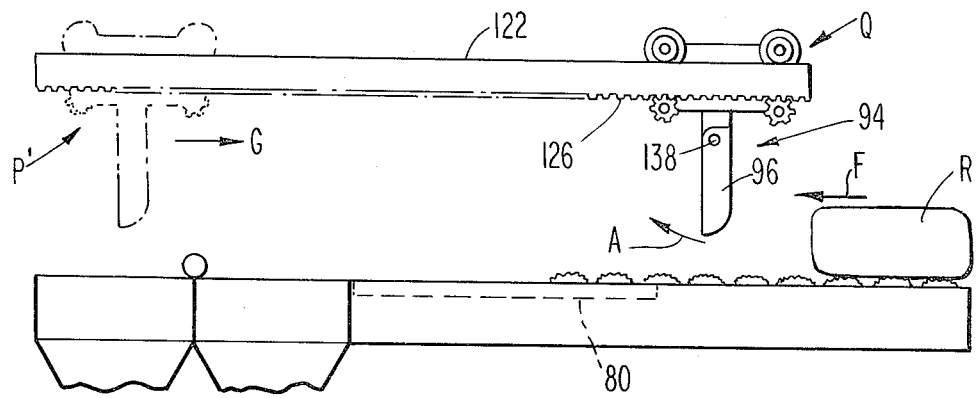
FIGS. 8, 9, 10, 11, 12 and 13 are a series of schematic views illustrating the operation of the automatic bag opening apparatus of the present invention.
Figure 9:
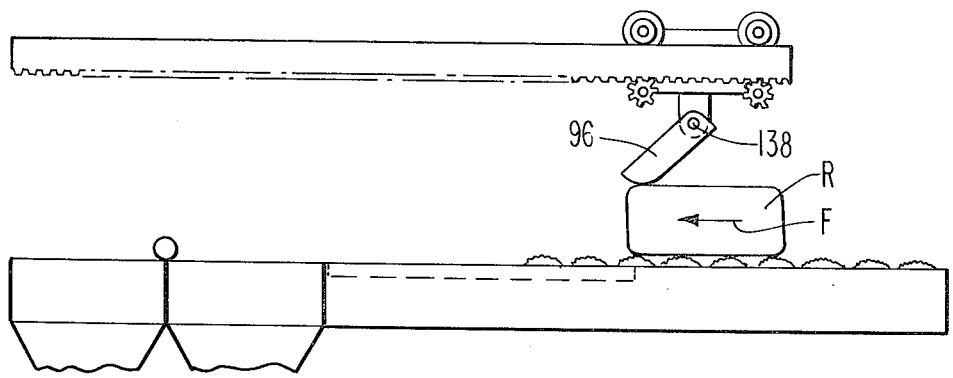
Figure 13:
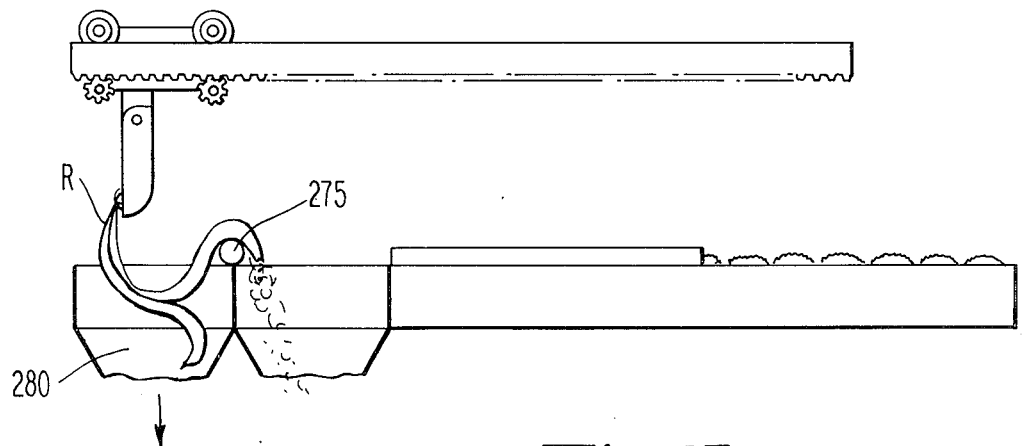

The normal at rest position of the gripping and moving means is illustrated in FIGS. 8 and 13. As shown in FIGS. 7, 8 and 9, the downwardly extending arms 96 of the gripping and moving means are adapted to pivot upwardly around shaft 138 as indicated by arrow A, in FIG. 7, to permit an incoming bag of material to pass therebelow as it proceeds backward to begin the cycle.

The components of the gripping and moving means are illustrated, specifically, in FIGS. 4, 5, 6 and 7. A carriage 100 includes a trolley 101 having a bottom plate 102 on which the horizontal moving power source 90 for the gripping and moving means is mounted. A housing 103, shown in FIG. 1, is mounted to the bottom plate and extends upwardly therefrom. This housing encloses the electrical control components so that particles released from opened bags will not interfere with the operation.

The horizontal drive consists of motor 104 of any suitable type, e.g., an electric motor, etc. This motor is connected to a conventional 90° gear box 106 which has a horizontally disposed output shaft 108 extending therefrom. A sprocket 110 is mounted to shaft 108 so that rotation of the shaft will be directly imparted to the sprocket. Two shafts 112 and 114 are rotatably mounted to plate 102 by means of brackets 115. Pairs of gears 116 and 117 are mounted to either end of shafts 112 and 114, (only one gear of each pair being shown). Also rigidly mounted to shaft 112 is sprocket 118. This sprocket has drive chain 120 positioned therearound, while the other end of chain 120 is positioned around and driven by sprocket 110.

Sprocket 118 is rotated through drive chain 120 thereby also rotating shaft 112 and sprocket 116. Carriage 100 also includes a pair of rails or tracks 122 having legs 124 mounted to and extending upwardly from main frame members 56, only two of the four legs 124 are shown in FIG. 1. The rails 122 extend over the first table and through the automatic bag opening apparatus. The rails have attached to the bottom surface a gear rack 126 over which gears 116 move. The rails also have a smooth upper surface 128 on which guide wheel 130 move. The wheels 130 have stub shafts 132 which are rotatably mounted in bearing 134.

The trolley portion of carriage 100 is therefore supported by wheels 132 which are free to roll over the smooth top surface 128 of the rails. The motive force for the trolley comes from the rotation of driven sprockets 116, mounted to driven shaft 112, through the lower notched portion 126 of the rails.

Figure 6:
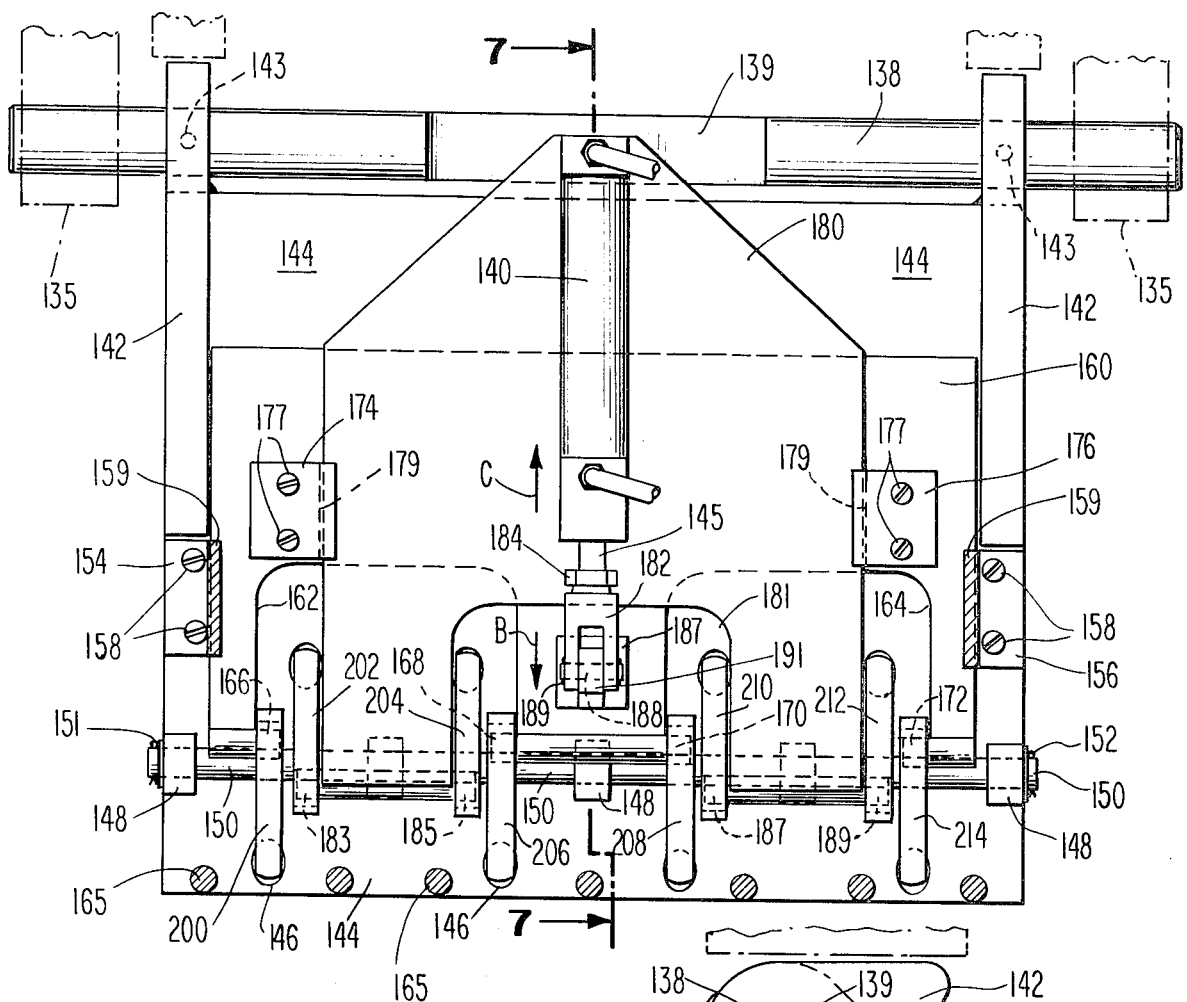
FIG. 6 is an enlarged end view of the bag gripping and moving means of the present invention taken along lines 6—6 of FIG. 4.

A pair of clevises 135 are mounted by nuts and bolts or the like, to the bottom surface of plate 102. Shaft 138 extends through and is free to rotate within clevises 135. The center portion 139 of shaft 138 is flattened, as shown in FIGS. 6 and 7.

Downwardly extending arms 96 are mounted to shaft 138. These arms consists of two triangular-shaped end members 142 which are rigidly mounted to shaft 138 by means of pins 143. Front plate 144 is secured by welding or the like to members 142 and extends vertically downwardly therefrom. The front plate contains apertures 145 and 146. As illustrated in FIG. 6, apertures 145 are positioned above apertures 146. A plurality of clevises 148 are mounted to the rear face 149 of front plate 144. Shaft 150 is rotatably mounted in clevises 148. The shaft is secured within the clevises by cotter pins 151 and 152 which pass through the respective ends of shaft 150.

Guide brackets 154 and 156, respectively, are secured by screws 158 to front plate 144. These brackets contain guide members 159 which retain and guide the vertical movement of plate 160. The rear ends 161 of guide members 159 are rigidly secured to a flat mounting plate 163 which is in turn rigidly secured to a J-shaped rear plate 165. Plate 160 is generally rectangular in shape and contains two U-shaped openings 162 and 164, respectively, in its lower portion. Stub shafts 166, 168, 170, and 172 extend into the U-shaped openings, as illustrated in FIG. 6. Guide brackets 174 and 176 are secured by screws 177 to plate 160. These brackets contain guide portions 179 which retain and guide vertical plate 180 while retaining the plates 160 and 180 in juxtaposition to each other, see FIG. 7.

Plate 180 has a generally U-shaped opening 181 positioned in its bottom portion. This opening contains stub shafts 185 and 187 which extend into the opening. Plate 180 also contains stub shafts 183 and 189 which extend outwardly from the bottom sides of the plate towards members 142.

A dual action hydraulic cylinder 140 is mounted to both plates 160 and 180. The cylinder contains piston 145 onto which is threaded clevis 182. This clevis is secured by lock nut 184 to the piston. The clevis is mounted to plate 160 by means of mounting bracket 191. This bracket has one end 187 rigidly secured by welding or the like, to plate 160. The other end 186 of bracket 191 contains an aperture which is aligned with the aperture in clevis 182 and through which shaft 188 passes. This shaft rotatably secures the bracket to the clevis. A pair of cotter pins 189 pass through the respective ends of shaft 188 thereby maintaining the shaft in the position illustrated in FIG. 6.

A second mounting bracket 190 interconnects plate 180 to barrel portion 141 of the cylinder. The second bracket is secured by bolts or the like to both the barrel and plate 180. The upper portion of the barrel of the cylinder is also mounted to plate 180 by welding or the like. The upper portion of plate 180 rests against the flat portion 139 of shaft 138 and is free to move vertically relative to the shaft.

Therefore, as illustrated in FIGS. 6 and 7 and discussed hereinabove, cylinder 140 is mounted to plates 160 and 180 which plates are mounted for vertical movement relative to each other by means of brackets 154, 156, 174 and 176.

As previously described, arms 96 contain shaft 150 which is rotatably mounted in clevis 148. Rotatably mounted to shaft 150 are a plurality of arcuate shaped fingers 200, 202, 204, 206 208, 210, 212 and 214. These fingers are positioned along the length of shaft 150, as is shown in FIG. 6. Each of these fingers contain an aperture 201 therethrough. These apertures are round in shape and are adapted to receive stub shafts 166, 183, 185, 168, 170, 187, 189 and 172 of plates 160 and 180. Shafts 166, 168, 170 and 172 of plate 160 are positioned through apertures contained in fingers 200, 206, 208 and 214. These fingers (200, 206, 208 and 214) are disposed on shaft 150 so that the pointed end 220 of these fingers will be aligned with the lower apertures 146 of plate 144. Shafts 183, 185, 187 and 189 are positioned through the apertures of fingers 202, 204, 210 and 212. These are disposed on shaft 150 so that pointed end 220 of the fingers will be aligned with the upper apertures 145 of plate 144.

The solid line position of the fingers illustrated in FIG. 7 depicts the normal "at rest" position of the fingers relative to each other. In this position (i.e., at rest) the fingers are in their fully retracted position. As cylinder 140 is activated, the piston 145 moves downwardly to a predetermined position, as indicated by arrow B in FIGS. 6 and 7, causing plate 160 and its associated stub shafts 166, 168, 170 and 172 to move downwardly within apertures 201 of fingers 200, 206, 208 and 214. This movement of the shafts within the respective apertures causes the pointed end 220 of these fingers to move through the lower openings 146 of plate 144.

When the piston has moved downward through a predetermined stroke, fingers 200, 206, 208 and 214 are in the position illustrated in phantom lines in FIG. 7. Once the piston has reached the end of its predetermined stroke the barrel portion 141 secured to plate 180 begins to move upward, as illustrated by arrow C in FIGS. 6 and 7. This upward movement of plate 180 will result in movement of shafts 183, 185, 187 and 189 upwardly within the apertures in fingers 202, 204, 210 and 212 thereby moving these fingers from the solid line positions illustrated in FIG. 7 to the phantom line positions.

It will be apparent from an examination of FIGS. 6 and 7 that when fingers are fully retracted (i.e. at rest) their pointed ends are abutted against the respective openings in plate 144. This positioning is accomplished by reversing the flow of the fluid in cylinder 140 (not shown) which bias the piston and the cylinder into the position illustrated by full lines in FIG. 7.

Referring specifically to FIGS. 8, 9, 1 and 2, after an incoming bag has been removed from the conveyor and is supported by first table 80 its (the bag's) rear-most end R engaged by the fingers of the gripping and moving means, it is then moved from table 80 into a second table 250. This second table is rigidly mounted to frame 52. The table is disposed at an elevation equal to the raised height of the first table to facilitate movement of the bag from the first to the second table. Table 250 contains a plurality of rails 251. These rails support the bag of material as it is moved over the table thereby further facilitating the movement of the bag of material over the table.

As the bag of material proceeds over the second table, it contacts a pair of cutting wheels 260. These wheels are rotatably mounted at the end of arcuate shaped arms 261 and 262. These arms are biased by any suitable means, into the center of table 250, as illustrated in FIGS. 2 and 3. Cutting wheels 260 are driven by any suitable power source, e.g., a pneumatic drive. The cutting wheels are overlapping and set at an angle to assure cutting of the bag of material as it move through the cutters. The end R of the bag of material which is engaged by the fingers of the gripping and moving means remains engaged to the fingers, even after the bag is cut and opened.

The opened bag of material is moved over table 250 until it reaches a material receiving hopper 270. This hopper is positioned immediately at the end of the second table 250.

Positioned across the far side of hopper 270 is a cylinder 275 over which the cut bag proceeds, see FIG. 13. The opened ends of the bag are pulled across the cylinder to remove any material which may not have fallen immediately into hopper 270. After the bag has moved over hopper 270 it is dropped into a second bag hopper 280. This second hopper is positioned adjacent the material receiving hopper and directs the empty bags of material into a bag bailing chamber 290. A hydraulic cylinder, the piston of which is shown in FIGS. 1 and 2, acts to compress a predetermined number of empty bags within chamber 290.

Mounted above the first and second tables and the material and bag hoppers 270 and 280 is a hood 300. This hood encloses both of the tables and both of the hoppers. A suitable vacuum pump, not shown, is connected to opening 310 to evacuate the area above the tables and the hoppers. It is important to maintain suction over these areas especially when bags containing material harmful to humans (e.g. asbestos) are being opened. Additional suction devices may be supplied at various positions within the apparatus. For example, in FIG. 2, suction openings 320 and 330 are positioned on either side of the second table. These suction openings are interconnected by suitable ducts (not shown) which may be vented directly to the atmosphere or connected to the main suction duct connected to opening 310.

The automatic operation of the automatic bag opener of the present invention is illustrated schematically in FIGS. 8-13.

A bag of material is transported by a loading conveyor (not shown) to the sprocket conveyor. During the automatic operation the gripping and moving means is in position P', shown in FIG. 8, when a bag enters the apparatus. The first bag continues on the sprocket conveyor until it contacts switch 400 at which time the loading conveyor (not shown) automatically stops. When the first bag moves off switch 400 the loading conveyor advances a second bag until it reaches switch 410. The first bag continues to move on the sprocket conveyor until it (the bag) contacts switch 420 which stops the sprocket conveyor. Meanwhile, the gripping and moving means is moving from position P' to position Q along rail 122. During this movement the carriage of the gripping and moving means trips and resets switch 430. This switch controls the operation of cylinder 140 of the gripping and moving means. When the gripping and moving means reaches position Q, it trips switch 440 which signals the raising of the first table, activates the pneumatic drive of the cutting wheels, and reverses the horizontal drive of the gripping and moving means.

On its return trip through the bag opener, as indicated by arrow F, in FIG. 8, switches 450 on trolley 101 is tripped by cam 455 which signals the extension of the gripping finger. The gripping and moving means continues through the apparatus over the second table 250 and the bag is cut and opened. When the gripping and moving means reaches and contacts switch 430 a signal is sent through the circuit to stop the cutting wheels, to lower the first table, and to stop the carriage for a predetermined amount of time over the hopper 270. After the predetermined time has elapsed, the gripping and moving means continues across rails 122 until switches 450 contact cam 460. At this time the cylinder 140 is deactivated withdrawing the gripping fingers and releasing the emptied bag of material into hopper 280. When the gripping and moving means reaches switch 470 the cycle repeats. Switch 470 also activates a counter which may be pre-set to any number of trips, which will correspond to the number of empty bags deposited in hopper 280. When the desired number of empty bags are in hopper 280 a signal is generated by the counter activating the bailer cylinder, the piston of which is shown in FIGS. 1 and 2.

If the bag contains material harmful to humans, the vent may be activated thereby venting the area above the automatic bag opener and removing particles of the material which may be released during the bag opening process from the immediate vacinity.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An apparatus for automatically opening a bag comprising:
    (a) a frame,
    (b) a conveyor for transporting the bag into the apparatus,
    (c) means operably associated with the conveyor for automatically removing the bag from said conveyor and for supporting and maintaining stationary said bag when said bag has reached a predetermined position on said conveyor, wherein said removing and supporting means comprises a first table operably associated with said conveyor for removing, supporting and maintaining stationary bags from said conveyor, and a second table positioned adjacent and rectilinearly aligned with the first table, and means for moving said bag from said first table to said second table,
    (d) means operably associated with the removing and supporting means for cutting the bag, wherein said cutting means comprises at least one cutting wheel pivotally mounted to the apparatus and adapted to contact said bag when said bag is on said second table, and (e) means operably associated with both said removing and supporting means and the cutting means for automatically gripping and moving said bag into and through said cutting means and automatically releasing said bag after said bag has moved through said cutting means.

2. An apparatus for automatically opening a bag comprising:
(a) a frame,
(b) a conveyor for transporting the bag into the apparatus,
(c) means movably mounted below the conveyor for automatically removing said bag from said conveyor and means for supporting said bag comprising:
 (i) a first table movably mounted below the conveyor for automatically removing said bag from said conveyor and for supporting and maintaining stationary said bag when said bag is positioned on the conveyor above the first table, and
 (ii) a second table stationarily mounted to said frame adjacent and rectilinearly aligned with the first table adapted to receive said bag from said first table and support said bag thereon,
(d) at least one cutting wheel pivotally mounted to said frame and adapted to contact and open said bag when said bag is supported on said second table,
(e) means operably associated with both said first and second tables and the cutting wheel for automatically gripping said bag when said bag is supported on said first table and moving said bag into and through said cutting wheel and automatically releasing said bag after said bag has moved through said cutting wheel, and
(f) vent means positioned above both said first and second table for removing particles from the surrounding environment released from said bag during the cutting of said bag.

3. An apparatus as recited in claim 2 wherein, said gripping and moving means comprises:
(a) carriage means movably mounted above both said first and second tables,
(b) means operably associated with the carriage means for moving said carriage means above said first and second tables,
(c) a plurality of arms pivotally mounted to and extending downwardly from said carriage means, and
(d) finger means operably associated with said arms for gripping said bag when said bag is positioned on said first table and releasing said bag when said bag has traversed said second table.

4. An apparatus as recited in claim 3 wherein, said arms have upper and lower ends and front and rear faces, the upper ends being pivotally mounted to said carriage means and the lower ends adapted to contact said bag.

5. An apparatus as recited in claim 3 wherein, said carriage means comprises: a rail means mounted above said first and second table, a trolley movably secured to the rail, drive means operably associated with the trolley for moving said trolley along said rail means, and means operably associated with the drive means for automatically controlling the movement of said trolley on said rail means.

6. An apparatus for automatically opening a bag comprising:
(a) a frame,
(b) a conveyor for transporting the bag into the apparatus,
(c) means movably mounted below the conveyor for automatically removing said bag from said conveyor and means for supporting said bag comprising:
 (i) a first table movably mounted below the conveyor for automatically removing said bag from said conveyor and for supporting and maintaining stationary said bag when said bag is positioned on the conveyor above the first table, and
 (ii) a second table stationarily mounted to frame adjacent and rectilinearly aligned with the first table adapted to receive said bag from said first table and support said bag thereon,
(d) at least one cutting wheel pivotally mounted to said frame and adapted to contact and open said bag when said bag is supported on said second table,
(e) means operably associated with both said first and second tables and the cutting wheel for automatically gripping said bag when said bag is supported on said first table and moving said bag into an through said cutting wheel and automatically releasing said bag after said bag has moved through said cutting wheels, and
(f) vent means positioned above both said first and second table for removing particles from the surrounding environment released from said bag during the cutting of said bag,
and wherein, said gripping and moving means comprises:
(a) carriage means movably mounted above said first and second tables,
(b) means operably associated with the carriage means for moving said carriage means above said first and second tables,
(c) a plurality of arms pivotally mounted to and extending downwardly from said carriage means, and
(d) finger means operably associated with said arms for gripping said bag when said bag is positioned on said first table and releasing said bag when said bag has traversed said second table,
and wherein, said arms have upper and lower ends and front and rear faces, the upper ends being pivotally mounted to said carriage means and the lower ends adapted to contact said bag, and wherein, said finger means comprise at least one arcuate shaped member movably mounted to said lower end of said arm and extending outwardly from said front face to grip and retain said bag, and means for automatically controlling the operation of said finger means.

7. An apparatus for automatically opening a bag comprising:
(a) a frame,
(b) a conveyor for transporting the bag into the apparatus,
(c) a first table mounted below the conveyor and movable vertically through said conveyor for automatically removing said bag from said conveyor and for supporting and maintaining stationary said bag when said bag is positioned on said conveyor above said first table, (d) a second table stationarily mounted to said frame adjacent and rectilinearly aligned with said first table adapted to receive said bag from said first table and support said bag thereon, (e) a pair of cutting wheels pivotally mounted to said frame and biased into the center of said second table to contact and open said bag when said bag is supported on said second table, (f) means for driving said cutting wheels, (g) means operably associated with the drive means for said cutting wheels for automatically controlling said drive means for said cutting wheels whereby said drive means for said cutting wheels is activated when said bag is supported on said first table and continues to operate until after said bag traverses said second table, (h) means operably associated with both said first and second tables and said cutting wheels for automatically gripping said bag when said bag is supported on said first table and moving said bag into and through said cutting wheel and automatically releasing said bag after said bag has traversed said second table, (i) means for compressing said bags into a bail after said bags have been released from said gripping and moving means, and (j) vent means positioned above both said first and second tables for removing particles from the surrounding environment released from said bag during the cutting of said bag.

* * * * *